(12) United States Patent
Norcia et al.

(10) Patent No.: US 12,078,992 B2
(45) Date of Patent: *Sep. 3, 2024

(54) UNMANNED AERIAL VEHICLE AERIAL SPRAYING CONTROL

(71) Applicant: Pyka Inc., Oakland, CA (US)

(72) Inventors: Michael Norcia, Berkeley, CA (US); Nathan White, Berkeley, CA (US); Tobias Wurft, Geraldine (NZ); Kyle Moore, Oakland, CA (US); Garrett Rini, Oakland, CA (US); Jason Petersen, San Francisco, CA (US); Chukwuma Ogunwole, San Francisco, CA (US)

(73) Assignee: Pyka, Inc., Oakland, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 17/913,402

(22) PCT Filed: Apr. 16, 2021

(86) PCT No.: PCT/US2021/027802
§ 371 (c)(1),
(2) Date: Sep. 21, 2022

(87) PCT Pub. No.: WO2021/216379
PCT Pub. Date: Oct. 28, 2021

(65) Prior Publication Data
US 2023/0112766 A1 Apr. 13, 2023

Related U.S. Application Data

(60) Provisional application No. 63/013,472, filed on Apr. 21, 2020.

(51) Int. Cl.
*G05D 1/00* (2024.01)
*A01M 7/00* (2006.01)
(Continued)

(52) U.S. Cl.
CPC ......... *G05D 1/0094* (2013.01); *A01M 7/0032* (2013.01); *A01M 7/0089* (2013.01);
(Continued)

(58) Field of Classification Search
CPC .................. B64U 2101/45; B64U 2101/47
(Continued)

(56) References Cited

U.S. PATENT DOCUMENTS

2019/0031346 A1    1/2019  Yong et al.
2019/0047694 A1    2/2019  Zivan et al.
(Continued)

FOREIGN PATENT DOCUMENTS

CN    106167098 A  * 11/2016  ............... B64D 1/18
CN    109720577 A  *  5/2019  ........... B64C 39/024
(Continued)

OTHER PUBLICATIONS

International Search Report and Written Opinion in PCT Application No. PCT/US2021/027802, dated Jan. 5, 2022.

*Primary Examiner* — Christopher P Ellis
(74) *Attorney, Agent, or Firm* — Cognition IP, P.C.; Edward Steakley

(57) ABSTRACT

Methods, systems, and apparatus, including computer programs encoded on computer storage media, for controlling spraying of chemicals by an unmanned aerial vehicle (UAV). An unmanned aerial vehicle system includes one or more processors configured to perform operations of autonomously performing a flight path by the UAV and dispersing a chemical by the UAV along portions of the flight path. The UAV may include a chemical spray system having one or more spray booms with multiple nozzles for dispersing a chemical. The chemical spray system may include one or more tanks attached to the body of the UAV and a pump fluidly connected to the tanks to disperse chemical via the spray booms.

21 Claims, 10 Drawing Sheets

(51) Int. Cl.
*B64C 39/02* (2023.01)
*B64D 1/18* (2006.01)
*B64U 10/25* (2023.01)
*B64U 101/45* (2023.01)

(52) U.S. Cl.
CPC .............. *B64C 39/024* (2013.01); *B64D 1/18* (2013.01); *G05D 1/101* (2013.01); *B64U 10/25* (2023.01); *B64U 2101/45* (2023.01); *B64U 2201/10* (2023.01); *B64U 2201/104* (2023.01)

(58) Field of Classification Search
USPC .......................................................... 244/13
See application file for complete search history.

(56) References Cited

U.S. PATENT DOCUMENTS

| | | | |
|---|---|---|---|
| 2019/0150357 A1* | 5/2019 | Wu ........................ H04N 7/188 |
| 2019/0382116 A1* | 12/2019 | Yanagishita .......... B05B 7/0075 |
| 2021/0024214 A1* | 1/2021 | Ott ........................ B64C 39/024 |
| 2022/0073205 A1* | 3/2022 | Hertzberg ............. B05B 13/005 |
| 2022/0245381 A1* | 8/2022 | Takla ...................... G06V 40/10 |
| 2022/0363403 A1* | 11/2022 | Godin .................... B64U 50/31 |
| 2023/0025073 A1* | 1/2023 | Kominami ............. B64U 10/14 |

FOREIGN PATENT DOCUMENTS

| | | | | | |
|---|---|---|---|---|---|
| CN | 113415422 | A | * | 9/2021 | .......... A01M 7/0042 |
| CN | 109358643 | B | * | 9/2022 | ............... B64D 1/18 |
| ES | 2890486 | T3 | * | 1/2022 | .......... B64C 39/024 |
| GB | 2082519 | A | | 3/1982 | |
| KR | 102192635 | B1 | * | 12/2017 | |
| KR | 20210101549 | A | * | 2/2018 | |
| KR | 20200062382 | A | * | 6/2020 | |
| KR | 102267022 | B1 | * | 10/2020 | |
| KR | 102187654 | B1 | * | 5/2021 | |
| WO | 2014160589 | A1 | | 10/2014 | |
| WO | WO-2014160589 | A1 | * | 10/2014 | ........... A01B 79/005 |
| WO | WO-2016191825 | A1 | * | 12/2016 | ............. A01B 39/18 |
| WO | WO-2017134659 | A1 | * | 8/2017 | ........... B64C 31/036 |
| WO | WO-2020140027 | A1 | * | 7/2020 | ............ A01M 25/00 |
| WO | WO-2021124656 | A1 | * | 6/2021 | ........... B64C 39/024 |
| WO | WO-2021172110 | A1 | * | 9/2021 | ............. B05B 11/048 |
| WO | WO-2021216379 | A2 | * | 10/2021 | .......... A01M 7/0032 |

* cited by examiner

```
┌─────────────────────────────────────────────────────────┐
│  SET SPRAY BOOM ATTACHED TO A UAV TO DISPERSE           │──── 610
│  CHEMICAL AT A FIRST DROPLET SIZE.                      │
└─────────────────────────────────────────────────────────┘
                              │
                              ▼
┌─────────────────────────────────────────────────────────┐
│  CAUSE THE UAV TO DISPERSE CHEMICAL AT THE FIRST        │──── 620
│  DROPLET SIZE ALONG A FLIGHT PATH OF THE UAV.           │
└─────────────────────────────────────────────────────────┘
                              │
                              ▼
┌─────────────────────────────────────────────────────────┐
│  DETERMINE THE OCCURRENCE OF A PHYSICAL OBSTACLE        │──── 630
│  ALONG THE FLIGHT PATH OF THE UAV.                      │
└─────────────────────────────────────────────────────────┘
                              │
                              ▼
┌─────────────────────────────────────────────────────────┐
│  IN RESPONSE TO THE DETERMINING THE PHYSICAL OBSTACLE,  │──── 640
│  CAUSE THE UAV TO ASCEND IN ALTITUDE.                   │
└─────────────────────────────────────────────────────────┘
                              │
                              ▼
┌─────────────────────────────────────────────────────────┐
│  ADJUST THE SPRAY BOOM TO DISPERSE CHEMICAL AT A        │
│  SECOND DROPLET SIZE LARGER THAN THE FIRST DROPLET      │──── 650
│  SIZE.                                                  │
└─────────────────────────────────────────────────────────┘
                              │
                              ▼
┌─────────────────────────────────────────────────────────┐
│  CAUSE THE UAV TO DISPERSE CHEMICAL AT THE SECOND       │──── 660
│  DROPLET SIZE WHILE THE UAV ASCENDS IN ALTITUDE.        │
└─────────────────────────────────────────────────────────┘
                              │
                              ▼
┌─────────────────────────────────────────────────────────┐
│  CAUSE THE UAV TO CEASE DISPERSING CHEMICAL.            │──── 670
└─────────────────────────────────────────────────────────┘
```

FIG. 6

```
┌─────────────────────────────────────────────────────┐
│   SET SPRAY BOOM ATTACHED TO A UAV TO DISPERSE      │──── 710
│           CHEMICAL AT A FIRST DROPLET SIZE.         │
└─────────────────────────────────────────────────────┘
                          │
                          ▼
┌─────────────────────────────────────────────────────┐
│   CAUSE THE UAV TO DISPERSE CHEMICAL AT THE FIRST   │──── 720
│     DROPLET SIZE ALONG A FLIGHT PATH OF THE UAV.    │
└─────────────────────────────────────────────────────┘
                          │
                          ▼
┌─────────────────────────────────────────────────────┐
│        DETERMINE A GEO-SPATIAL LOCATION OF THE UAV. │──── 730
└─────────────────────────────────────────────────────┘
                          │
                          ▼
┌─────────────────────────────────────────────────────┐
│  IN RESPONSE TO THE DETERMINING THE GEO-SPATIAL     │
│  LOCATION, ADJUST THE SPRAY BOOM TO DISPERSE CHEMICAL│──── 740
│    AT A SECOND DROPLET SIZE DIFFERENT THAN THE FIRST│
│                    DROPLET SIZE.                    │
└─────────────────────────────────────────────────────┘
                          │
                          ▼
┌─────────────────────────────────────────────────────┐
│   CAUSE THE UAV TO DISPERSE CHEMICAL AT THE SECOND  │──── 750
│    DROPLET SIZE WHILE THE UAV ALONG THE FLIGHT PATH.│
└─────────────────────────────────────────────────────┘
                          │
                          ▼
┌─────────────────────────────────────────────────────┐
│        CAUSE THE UAV TO CEASE DISPERSING CHEMICAL.  │──── 760
└─────────────────────────────────────────────────────┘
```

FIG. 7

```
┌─────────────────────────────────────────────────┐
│ OBTAIN A FIRST AIR TEMPERATURE AT A FIRST ALTITUDE. │─ 810
└─────────────────────────────────────────────────┘
                        │
                        ▼
┌─────────────────────────────────────────────────┐
│ CAUSE THE UAV TO DISPERSE CHEMICAL ALONG A FLIGHT │─ 820
│                PATH OF THE UAV.                   │
└─────────────────────────────────────────────────┘
                        │
                        ▼
┌─────────────────────────────────────────────────┐
│     OBTAIN A SECOND AIR TEMPERATURE AT A SECOND   │─ 830
│                    ALTITUDE.                      │
└─────────────────────────────────────────────────┘
                        │
                        ▼
┌─────────────────────────────────────────────────┐
│ DETERMINE THE LIKELIHOOD OF A TEMPERATURE INVERSION │─ 840
│   BY COMPARING THE FIRST AND SECOND TEMPERATURES. │
└─────────────────────────────────────────────────┘
                        │
                        ▼
┌─────────────────────────────────────────────────┐
│ IF A TEMPERATURE INVERSION IS DETERMINED TO LIKELY │
│ EXIST, THEN CAUSE THE UAV TO CEASE DISPERSION OF THE │─ 850
│                    CHEMICAL.                      │
└─────────────────────────────────────────────────┘
```

FIG. 8

```
            ┌─────────────────────────────────────────────┐
            │     PERFORM A PRE-PLANNED FLIGHT PATH.      │─── 910
            └─────────────────────────────────────────────┘
                                 │
                                 ▼
            ┌─────────────────────────────────────────────┐
            │ DISPERSE CHEMICAL ALONG THE PATH OF THE     │─── 920
            │           PRE-PLANNED FLIGHT PATH.          │
            └─────────────────────────────────────────────┘
                                 │
                                 ▼
            ┌─────────────────────────────────────────────┐
            │ PERIODICALLY DETERMINE THE OCCURRENCE OF A  │─── 930
            │           SPRAYING CESSATION EVENT.         │
            └─────────────────────────────────────────────┘
                                 │
                                 ▼
            ┌─────────────────────────────────────────────┐
            │ IF THE OCCURRENCE OF A CESSATION EVENT IS   │─── 940
            │ DETERMINED, STOP THE SPRAYING OF THE CHEMICAL.│
            └─────────────────────────────────────────────┘
                                 │
                                 ▼
            ┌─────────────────────────────────────────────┐
            │ OPTIONALLY, TRANSMIT TO A GROUND CONTROL    │─── 950
            │ STATION, INFORMATION PERTAINING TO THE      │
            │             CESSATION EVENT.                │
            └─────────────────────────────────────────────┘
                                 │
                                 ▼
            ┌─────────────────────────────────────────────┐
            │  DETERMINE WHETHER TO RESUME SPRAYING OF    │─── 960
            │               THE CHEMICAL.                 │
            └─────────────────────────────────────────────┘
                                 │
                                 ▼
            ┌─────────────────────────────────────────────┐
            │        RESUME SPRAYING OF THE CHEMICAL.     │─── 970
            └─────────────────────────────────────────────┘
```

FIG. 9

```
┌─────────────────────────────────────────────────┐
│ AUTONOMOUSLY PERFORM A FLIGHT PATH BY A UAV     │──1010
│ HAVING PROPELLERS CONNECTED TO MOTORS.          │
└─────────────────────────────────────────────────┘
                        ↓
┌─────────────────────────────────────────────────┐
│ CEASE SPINNING OF ONE OR MORE MOTORS.           │──1020
└─────────────────────────────────────────────────┘
                        ↓
┌─────────────────────────────────────────────────┐
│ DISPERSE CHEMICAL ALONG THE FLIGHT PATH.        │──1030
└─────────────────────────────────────────────────┘
                        ↓
┌─────────────────────────────────────────────────┐
│ CEASE DISPERSING CHEMICAL ALONG THE FLIGHT PATH.│──1040
└─────────────────────────────────────────────────┘
                        ↓
┌─────────────────────────────────────────────────┐
│ START ROTATION OF THE CEASED ONE OR MORE MOTORS.│──1050
└─────────────────────────────────────────────────┘
```

FIG. 10

UNMANNED AERIAL VEHICLE AERIAL SPRAYING CONTROL

CROSS-REFERENCE TO RELATED APPLICATIONS

This application is a 371 U.S. National Stage application of International Application No. PCT/US2021/051051, filed on Apr. 16, 2021, which claims the benefit of priority to U.S. Provisional Application No. 63/013,472 filed on Apr. 21, 2020, the contents of which are incorporated herein by reference in their entirety.

BACKGROUND

Unmanned Aerial Vehicles can be used to perform aerial spraying for crop treatments. UAV aerial spraying allows for chemical dispersion over a surface area of a crop or field. Rotor-based UAVs may be manually controlled by an operator to perform spraying operations. However, rotor-based UAVs typically have a limited payload and overall flight duration. These limitations require an operator to constantly refill chemical tanks and change out batteries. A fixed-wing UAV having a larger payload and flight time is desirable to overcome the limitations of the rotor-based UAVs.

SUMMARY

Described herein are methods, systems, and apparatus, including computer programs encoded on computer storage media, for controlling spraying of chemicals by an unmanned aerial vehicle.

In general, one innovative aspect of disclosed embodiments includes a fixed-wing unmanned aerial vehicle (UAV) system including one or more processors configured to perform operations of autonomously performing a flight path by the UAV and dispersing a chemical by the UAV along portions of the flight path. The UAV may include a chemical spray system having one or more spray booms with multiple nozzles for the dispersing a chemical.

In another aspect of the system, the chemical spray system includes one or more tanks attached to the body of the UAV, a pump fluidly connected to the tanks, and spray booms are attached a body of the UAV. The multiple nozzles may include a rotary atomizer for controlling the droplet size of the sprayed chemical.

In another aspect of the system, the UAV may receive or generate a flight plan for autonomously flying a flight path where the flight plan includes geo-spatial based commands for controlling spraying operations. The UAV autonomously performs at least a portion of the flight path according the received flight plan. The UAV periodically determines a geo-spatial location of the UAV while the UAV is in-flight. The UAV may determine that the UAV is near a first location of one of the geo-spatial based commands. The UAV may perform a first geo-spatial command instructing the UAV to begin spraying. The UAV may determine that the UAV is near a second location of one of the geo-spatial based commands. The UAV may then perform a second geo-spatial command instructing the UAV to stop spraying.

In another aspect of the system, the UAV may set the spray boom to disperse a chemical at a first droplet size. The UAV disperses a chemical at the first droplet size along a flight path of the UAV. The UAV may determine the occurrence of a physical obstacle along the flight path of the UAV. In response to determining the occurrence of a physical object along the flight path of the UAV, the UAV may automatically ascend in altitude. The UAV may adjust the spray boom to disperse chemical at a second droplet size larger than the first droplet size. The UAV may to disperse the chemical at the second droplet size while the UAV ascends in altitude. The UAV may then cease dispersing the chemical.

In another aspect of the system, the UAV may set a spray boom to disperse a chemical at a first droplet size. The UAV may disperse a chemical at the first droplet size along a flight path of the UAV. The UAV may periodically determine its geo-spatial position. In response to determining the geo-spatial position of the UAV along the flight path, the UAV may set the spray boom to disperse chemical at a second droplet size different than the first droplet size. The UAV may disperse the chemical at the second droplet size along the flight path. The UAV may then cease dispersing the chemical.

In another aspect of the system, the UAV may obtain a first air temperature value at a first altitude. The UAV may disperse chemical along a flight path of the UAV. The UAV may obtain a second air temperature value at second altitude. The UAV may determine the likelihood of a temperature inversion by comparing values of the first and second air temperatures. If the UAV determines that a temperature inversion is likely to exist, then the UAV may cease dispersing chemical.

In another aspect of the system, the UAV autonomously performs a flight path. The UAV disperses chemical along the flight path. The UAV may periodically determine the occurrence of a spraying cessation event. If the UAV determines the occurrence of a spraying cessation event, then the UAV may cease dispersing the chemical. The UAV may determine whether to resume spraying of the chemical. The UAV may resume spraying of the chemical along the flight path if the conditions for the cessation event no longer exist.

In another aspect of the system, the UAV autonomously performs a flight path. The UAV may have one or more motors connected to operating spinning propellers. The UAV may cease rotation of one or more motors. The propellers may be of a foldable type such that ceasing rotation of the propeller allows the propeller to fold backwards. The UAV continues rotation of at least one motor and connected propeller to provide forward thrust of the UAV. The UAV may then disperse chemical along the flight path. The UAV may then cease dispersing the chemical along the flight path. The UAV starts rotation of the one or more ceased motors, thereby providing forward thrust to the UAV Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 6 illustrates an example process for an unmanned aerial vehicle for adjusting the droplet size of a dispersed chemical.

FIG. 7 illustrates an example process for an unmanned aerial vehicle for adjusting the droplet size of a dispersed chemical.

FIG. 8 illustrates an example process for an unmanned aerial vehicle for inversion detection and chemical spray cessation.

FIG. 9 illustrates an example process for an unmanned aerial vehicle for automated chemical dispersion cessation.

FIG. 10 illustrates an example process for an unmanned aerial vehicle for folding propeller for aerial spraying.

DETAILED DESCRIPTION

Figure 1A:
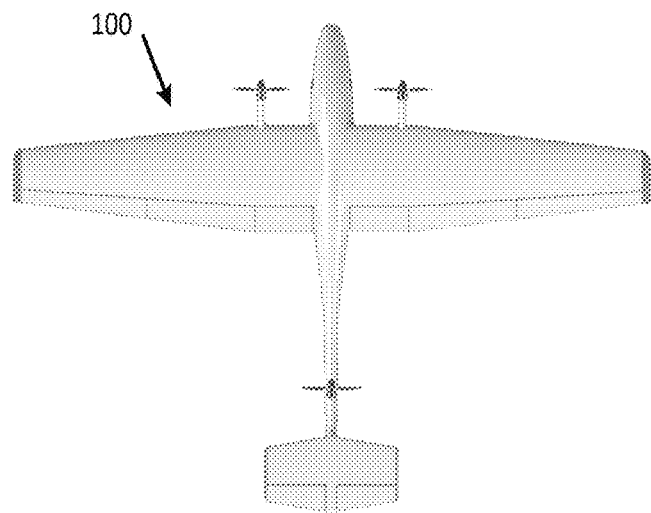
FIG. 1A illustrates a three-dimensional top-view of an example unmanned aerial vehicle.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Unmanned Aerial Vehicle

Figure 1B:
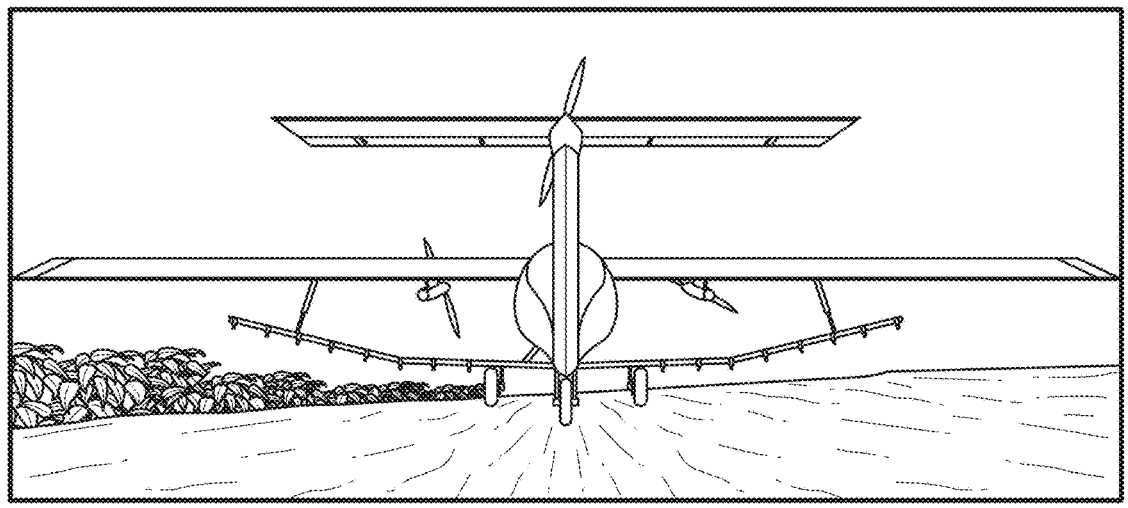
FIG. 1B illustrates a three-dimensional rear-view of an example unmanned aerial vehicle.
Figure 1C:
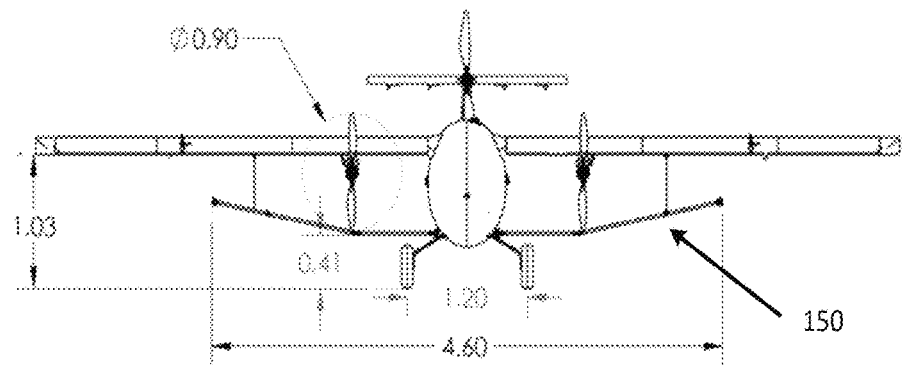
FIG. 1C illustrates a schematic rear plan view of the example unmanned aerial vehicle of FIG. 1.
Figure 2:
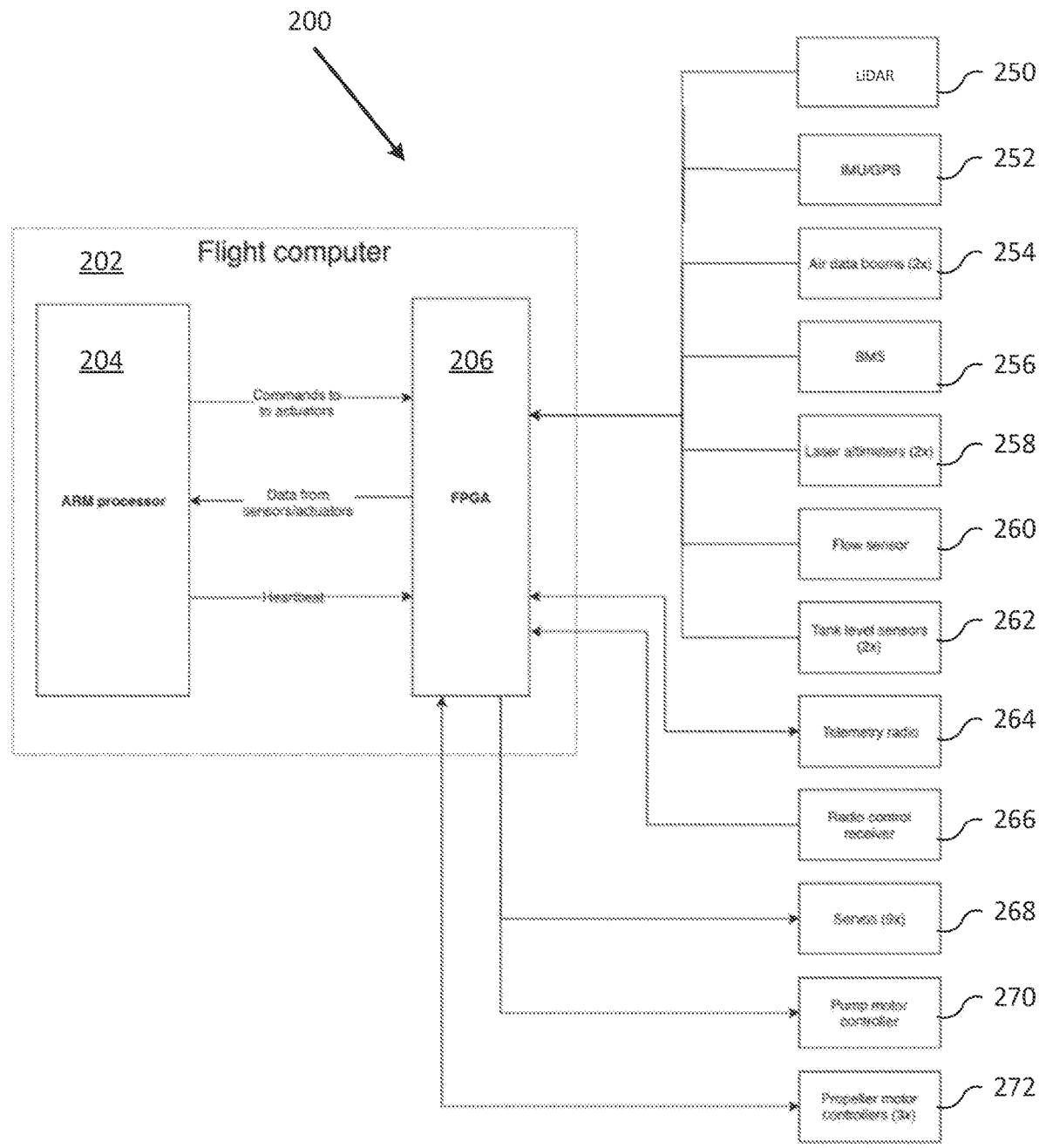
FIG. 2. illustrates a block diagram of an example unmanned aerial vehicle architecture.

FIGS. 1A-1C illustrate an example of an unmanned aerial vehicle (UAV). In one embodiment, a fixed-wing UAV 100 may be used for chemical spraying during UAV flight operations. In one example, the aircraft is a three-motor, electric-powered, high wing, propeller driven UAV 100. The UAV 100 may be configured with three 8 kilo-watt continuous electric motors. One motor is attached to the right and left wings. Another motor is attached forward of the horizontal stabilizer of the tail section. In one configuration, the two wing motors drive fixed-pitch foldable propellers and the tail motor drives a fixed pitch non-foldable propeller. Other UAV types, such as vertical take-off and landing, multi-rotor, helicopter unmanned aerial vehicles may be suitable for the operations as described herein.

Flight Control System

FIG. 2 illustrates a block diagram of an example unmanned aerial vehicle architecture for implementing the features and processes described herein. A UAV primary processing system 200 can be a system of one or more flight computers 202, or software executing on a system of one or more flight computers 202, which is in communication with, or maintains, one or more databases. The UAV primary processing system 200 can be a system of one or more processors, graphics processors, I/O subsystem, logic circuits, analog circuits, associated volatile and/or non-volatile memory, associated input/output data ports, power ports, etc., and/or one or more software processing executing one or more processors or computers.

The UAV processing system 200 may include a LiDAR (light detecting and ranging) 250, IMU/GPS 252, air data booms 254, a BMS 256, laser altimeters 258, flow sensor 260, tank level sensors 262, telemetry radio 264, radio control receiver 266, servos 268, a pump motor controller 270, propeller motor controllers 272, and/or other sensors and control devices. Additionally, the UAV processing system 200 may include various operating system and software modules to perform the operations described herein.

The LiDAR 250 determines distance of the UAV from other objects using light detection and ranging. The IMU/GPS 252 determines the roll, pitch and yaw of the UAV during flight, and the UAV's geo-spatial position in a 3-dimensional space. The air data booms 254 determine the UAV's movement relative to the air (e.g., angle of attach, angle of side slip). The battery management system (BMS) 256 controls the battery operation of the UAV 100. The laser altimeters 258 determine the distance of the UAV above the surface of the ground. The flow sensor 260 determines the flow rate of chemical being pumped from the chemical tanks. The tank level sensors 262 determine the quantity of fluid in the chemical tanks. The telemetry radio 264 transmits data and UAV telemetry information a ground control station (GCS). The radio control receiver 266 receives data and commands from the GCS. The servos 268 control flight control surfaces, such as rudder, ailerons and elevators. The UAV may also be configured with flaps. The pump motor control 270 controls a pump to pump chemical from the chemical tanks. The propeller motor controllers 272 controls the rotational speed (RPM) of the propellers. The UAV processing system 200 may also include one or more temperature sensors to measure the ambient temperature of the UAV 100.

The UAV onboard memory may include non-volatile memory, such as one or more magnetic disk storage devices, solid state hard drives, or flash memory. Other volatile memory such a RAM, DRAM, SRAM may be used for temporary storage of data while the UAV is operational. UAV processing system 200 databases may store information describing UAV flight operations, flight plans, waypoint commands, geofence coordinates, physical obstacle coordinates, terrain data and other information.

The UAV processing system 200 may be coupled to various radios, and transmitters for manual control of the UAV, and for wireless or wired data transmission to and from the UAV primary processing system. The UAV 100 may use one or more communications subsystems, such as a wireless communication or wired subsystem, to facilitate communication to and from the UAV. Wireless communication subsystems may include radio transceivers, and infrared, optical ultrasonic, electromagnetic devices. Wired communication systems may include ports such as Ethernet, USB ports, serial ports, or other types of port to establish a wired connection to the UAV with other devices, such as a ground control system, cloud-based system, or other devices, for example a mobile phone, tablet, personal computer, display monitor, other network-enabled devices.

In one embodiment, the UAV 100 may be controlled via a ground control station (GCS). The GCS may be a laptop, mobile device or other suitable computing device. The GCS may include a user interface for displaying information about the flight operations of the UAV 100. The GCS may submit a flight plan to the UAV, wherein the flight plan defines a flight path with multiple waypoints. For example, while the UAV 100 is performing flight operations, the user interface of the GCS may present the UAV's 100 indicated airspeed, attitude, altitude, direction (i.e., heading), sideslip, power setting, battery charge state, RPM of each of the motors, the temperature of the motor controllers, tank levels, pump flow rate, acres/liters remaining in a spray mission.

The GCS may display a satellite or aerial view of a map or other aerial imagery depicting real-time position of the UAV 100 while in flight. Moreover, the UAV 100 may include sensors, such as digital camera, LiDAR, thermal sensors, and the sensor data may be transmitted from the UAV 100 to the GCS. The received information may be presented via a user interface of the GCS.

The UAV 100 may operate in a manual, semi-autonomous and/or autonomous mode to perform flight operations. In one embodiment, the UAV 100 may receive a pre-determined flight plan from the GCS or other computing device. In another embodiment, the UAV primary processing system 200 generates its own flight plan. The GCS may transmit to the UAV data values from received user input, such as the location of the plot or field to be sprayed, the location of vertical obstacles (e.g. trees, buildings, towers, power lines, poles, etc.), spray parameters (e.g., flow rate indicating how many gallons per acre to spray). The UAV primary processing system 200 then determines based on the received data values one or more flight plans and flow rate to disperse chemical over the field. The UAV primary processing system 200 may transmit the to the GCS the one or more flight plans. The GCS may present the generated flight plan via a user interface to an operator. In one embodiment, the operator may select one of the generated flight plans for execution by the UAV 100. The GCS may receive a confirmation of the flight plan to be flown by the UAV 100, and the UAV 100 may then autonomously perform the selected flight plan. During the autonomous flight of the UAV 100, the GCS may display via user interface, the real-time position of the UAV 100 along the flight path of the flight plan.

Chemical Dispersion System

Figure 3:
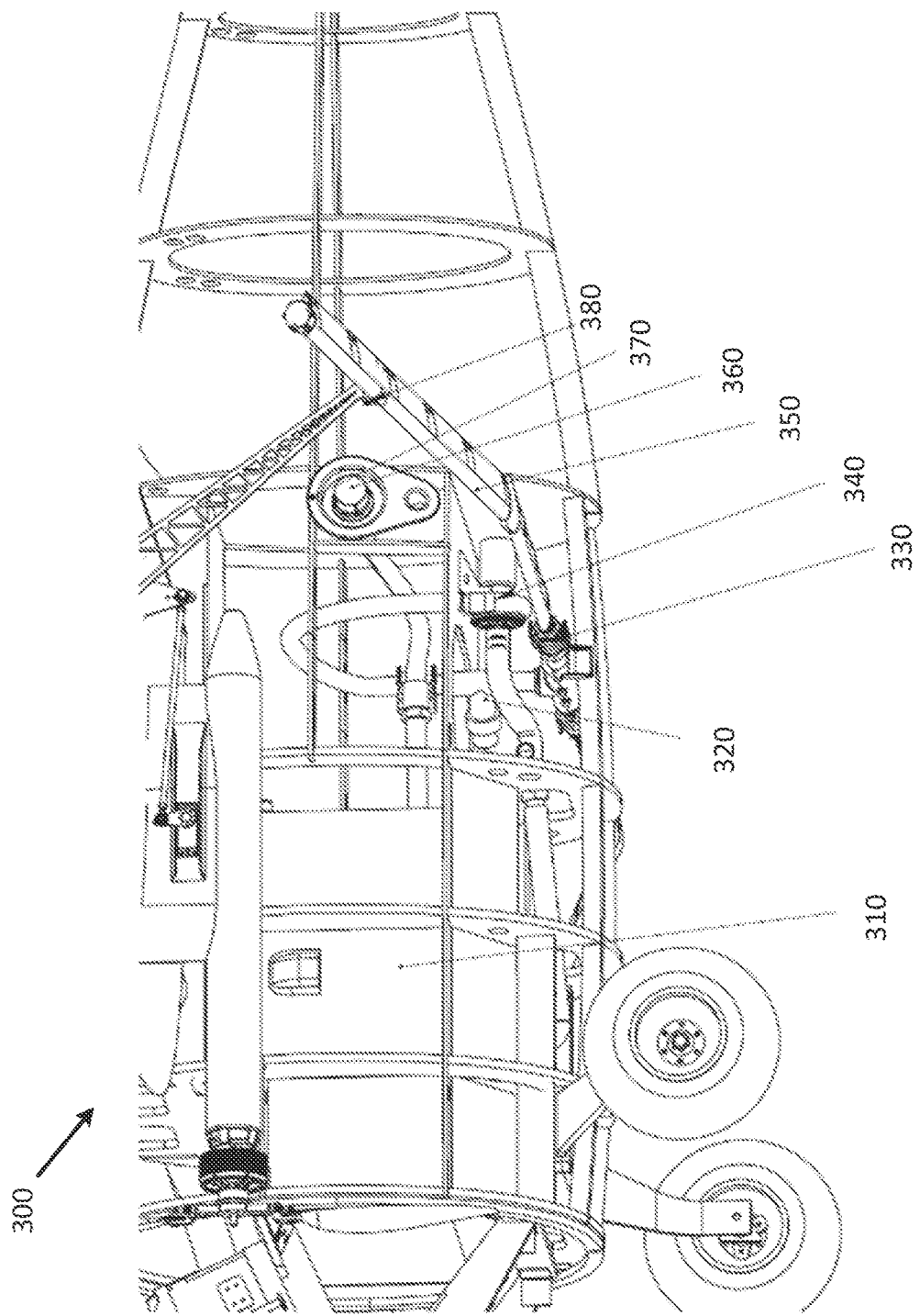
FIG. 3 illustrates a schematic view of an example unmanned aerial vehicle liquid/chemical dispersion system.

FIG. 3 illustrates a schematic view of an example unmanned aerial vehicle liquid/chemical dispersion system. The chemical dispersion system 300 may be used by the UAV to disperse liquid and chemicals over a surface area on the ground, such over crops of a field. The UAV primary processing system 200 controls operation of the chemical dispersion system 300. The chemical dispersion system 300 includes one or more tanks 310 to hold chemicals or other liquids. A fill port 370 may be used to add chemical or liquid to the one or more tanks 310. Separate chemicals may be housed in separate tanks, and then mixed together immediately before release. The tanks may be constructed of a composite material with internal baffling. The one or more tanks 310 may include vents to release excess liquid due to overfilling of the tanks or pressure build up in the tanks.

The one or more tanks are connected to plumbing, such as pipes or tubing, which extend from the tanks to a pump 340. If the UAV 100 is configured with multiple tanks, a separate pump may be used for separate tanks. The UAV primary processing system 200 may control the pump 340 to set the pump speed to generate a particular flow rate of chemical to be released from the one or more tanks 310. The UAV primary processing system 200 may monitor the flow rate of the chemical via a flow rate sensor 320. The UAV primary processing system 200 may increase or decrease the pump 340 speed to achieve a desired flow rate. An example of a pump that may be used with the chemical dispersion system 300 is a high speed, high bandwidth centrifugal pump. By measuring the flow rate of the chemical dispersion system 300 in comparison to the ground speed of the UAV, the UAV primary processing system 200 may control the pump speed to maintain a consistent application rate of chemical over a surface area.

The UAV 100 includes one or more detachable spray booms 150, 350 connected to the body of the UAV 100. For example, a spray boom 150, 350 may be connected to the body of the UAV 100 by way of a spray boom camlock attachment 330, and a spray boom attachment hanger 380. The spray boom camlock attachment 330 and the spray boom attachment hanger 380 provides two attachment points for the spray boom 150, 350. Spray booms 150, 350 may be attached to the right and left sides of the UAV 100.

The spray booms 150, 350 include multiple ports or nozzles for dispersing the chemical. In one configuration, the nozzles are equally spaced on the spray boom. For example, in one configuration each right and left spray booms may have between 5-12 spray nozzles. In one configuration, the spray nozzles have a fixed or manually set spray droplet size. The nozzles may be manually set to release droplets of a particular size (e.g., large droplets to droplets, such as a fine mist). In another configuration, the nozzles may be systematically adjusted by the UAV primary processing system 200. For example, the spray booms 150, 350 may be configured with variable speed electric rotary atomizers. The UAV primary processing system 200 may control the droplet size of dispersed chemical by changing the speed at which the rotary atomizer spins. Also, the spray nozzles may be configured to allow the orifice size of the nozzle to be electro-mechanically adjusted by the UAV primary processing system 200. Moreover, the spray booms 150, 350 may be configured in a manner to allow the spray booms 150, 350 to be electro-mechanically titled or lifted by servos.

The GCS may receive user input for the creation, editing, deletion or selection of a variable rate spray map (e.g., a heat map) describing how much chemical should be delivered across the field. The variable rate spray map may be stored in a database, data file or other data structure. The variable rate spray map identifies geospatial locations of which chemical and at what spray rate would be used by the UAV during spraying operations. For different areas of a field, the spray rate of a chemical may be set to a chemical type (i.e., which UAV tank to use), a spray rate (e.g., constant rate, variable rate, and or no spray), and for the spray rate the amount of chemical to be sprayed over an area, such as volume per acre or volume per minute.

The variable rate spray map may be created in different ways by the GCS. For example, the user interface of the GCS may display digital imagery depicting an aerial view of a field. The GCS may analyze the imagery and automatically determine multiple locations of the field where chemical should be sprayed. For those multiple locations, the GCS may determine a chemical type and spray rate for different areas of the field. Also, the GCS may receive user input where the user may select various zones or areas of the field where different amount of chemical may be sprayed. For example, the GCS may receive a selection of a first zone where chemical should be displayed at a first spray rate, and a second zone where chemical should be displayed at a second spray rate where the second spray rate is different than the first spray rate. The GCS may also receive a pre-determined variable rate spray map from another system (such an Internet cloud-based system of other device). This allows the GCS to receive a pre-planned spray map that may have been created from another planning system.

In addition to other information, the GCS may transmit the variable rate spray map to the UAV. The UAV primary processing system 200 may determine a flight plan based on the received variable rate spray map. The flight plan may include geo-spatial locations of where the UAV is to fly along a flight path and disperse chemical. The UAV may then autonomously execute the flight plan for a defined area and disperse chemical at a variable or constant rate along different sections of the flight path.

While the UAV 100 primarily operates in an automated spraying mode, the GCS may allow for the manual control and spraying of chemicals by the UAV. The GCS may be configured to receive a user input which causes the release of chemicals from the chemicals dispersion system 300. For example, user input may be provided via toggles, levers, sliders, switches and/or manual controls of the GCS. Moreover, the GCS may include a touch-sensitive graphical user interface with which an operator may provide user input to the GCS. For example, a user interface of the GCS may provide graphical controls where a flow rate of the chemicals to be dispersed may be set. Additionally, the flow rate may be set manually by toggles or switches of the GCS. For example, the GCS may include positions of high, medium and low which would set the flow rate to predetermined flow rates as configured on the UAV 100.

In a manual spraying mode, in response to receiving a user input to release chemical, the GCS wirelessly transmits commands to the UAV primary processing system 200. The UAV primary processing system 200 then will cause the chemical dispersion system 300 to release chemicals at the volume and/or flow rate as set by the GCS. The GCS may send start and stop commands to the UAV primary processing system 200, which in turn will cause the UAV to start and stop releasing chemicals. In one mode, the UAV 100 may receive a predetermined flight plan to fly a flight path over a field. The UAV 100 autonomously fly the flight plan. During flight of the UAV, the operator may manually control chemical release by the UAV using the controls of the GCS.

The primary processing system 200 may monitor the volume (e.g., the tank level) of liquid in the tanks. The primary processing system 200 may transmit volume information describing the remaining volume in the tank(s) to the GCS, which in turn the GCS displays the remaining volume via a user interface of the GCS.

Flight Path for Aerial Spraying

Figure 4A:
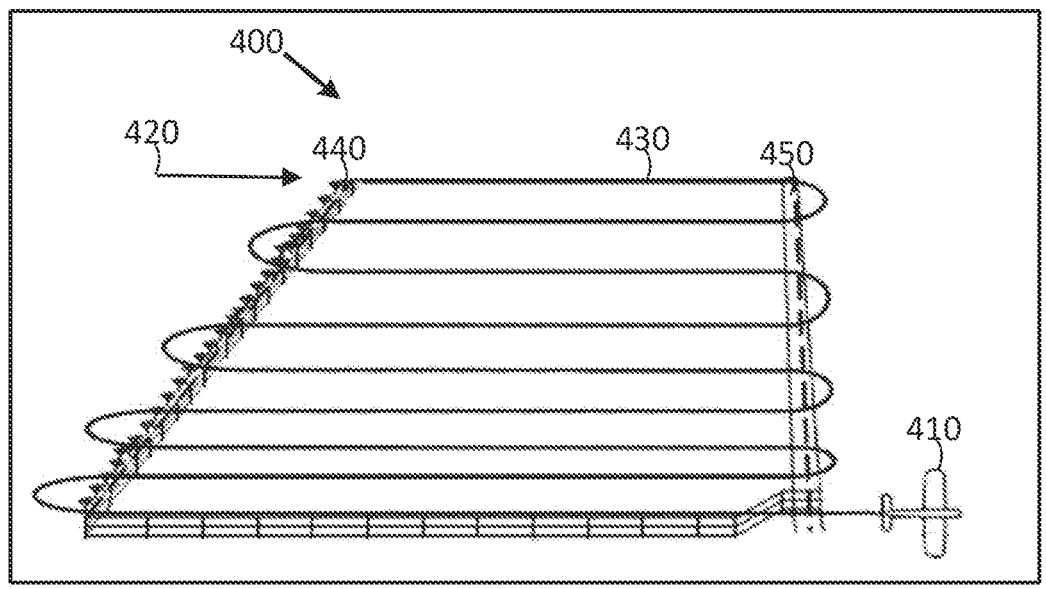
FIG. 4A illustrates an example of an unmanned aerial vehicle performing a flight pattern.

FIG. 4A illustrates an example of an unmanned aerial vehicle performing a flight pattern. The UAV 100, 410 may autonomously fly a pre-determined flight plan having a designated flight path 430. The UAV 100, 410 may receive from a GCS and store in memory the flight plan and autonomously perform the flight plan. The UAV 100, 410 may also generate and autonomously perform a generated flight plan. The flight plan may include geo-spatial locations of where the UAV 410 should fly to along the flight path. For example, the flight plan may have predetermined way points identifying multiple GPS locations (e.g., geo-spatial coordinates including altitudes) of where the UAV 410 would fly to along the flight path 430. The UAV 410 may determine based on its current geospatial location of whether to begin, continue and/or cease spraying operations. For example, the UAV 100, 410 would begin the flight path at an entry position 420 and begin spraying over the crop or field at a predetermined geospatial location.

The UAV 100, 410 may perform a UAV generated flight plan or a flight plan received from the GCS, or from some other computing device, where the flight plan includes waypoint-based instructions of where to begin and where to end spraying. For example, the example flight path 430 has nine parallel legs of the flight path. If spraying was desired along each of the nine legs, then the UAV 100, 410 would include nine start and stop waypoint-based spraying instructions. In other words, the flight plan would include a location-based start spraying command and a stop spraying command for each of the nine legs. For example, for a particular leg, the flight plan may have a waypoint-based start spraying command and a waypoint-based stop spraying command. Together, the start and stop spraying commands define a spray segment. Each of the legs may also include multiple spray segments where the UAV would start and stop spraying multiple times along the path of a particular leg.

Each of the waypoint-based commands are geo-spatially based. When the UAV 100, 410 determines that it is within proximity of the waypoint geo-spatial location (e.g., 1-3 meters), then the UAV initiates the spraying command (e.g., to start or stop spraying). For example, as the UAV 100, 410 begins the first leg at the top of FIG. 4A, a geo-spatially based waypoint command would cause the UAV to initiate spraying near the position over the fence-line 440. The UAV 100, 410 would continue to spray along the first leg until it reaches another position near the right side of the fence 440. The UAV 100, 410 would have received as part of the flight plan, a waypoint-based instruction to stop spraying. For example, this waypoint instruction would occur at a position before reaching the road 450.

In addition to the waypoint-based instructions informing the UAV 100, 410 of when to start and stop spraying, the waypoint-based commands, may include values for the spray-volume, chemical or tank type, droplet size and other parameters to control the spraying of chemicals. The waypoint-based commands may also provide additional parameters about the flow rate, droplet size and/or which chemical to use (e.g., tank selection if the UAV has multiple tanks). For example, the UAV 100, 410 may determine based on its determined geo-spatial position (and/or altitude), to change the flow rate and/or droplet size of dispersed chemical. Additionally, the UAV 100, 410 may switch tanks to use different a chemical based on the geo-spatial location of the UAV 100, 410.

For example, near the fence line 440 the UAV 100, 410 the waypoint-based instructions may include the value of a droplet size to use (such as a larger droplet size). Another waypoint-based instruction along a leg of the flight plan may instruct the UAV 100, 410 to reduce the droplet size (such as smaller droplet size to create a finer spray for optimizing surface coverage on crops and plants). Likewise, the UAV 100, 410 may increase or decrease the rate of flow of dispersed chemical based on the UAV's geo-spatial position. This allows the UAV 100, 410 to control the amount and coverage of chemical dispersed along different portions of the flight path 430. As will be discussed below in reference to FIG. 10, the waypoint instructions may also instruct the UAV, while in flight, to start and stop the wing motors to allow the wing propellers to fold-back.

In one embodiment, the UAV 100, 410 may use a geofence to determine whether or not the UAV 100, 410 may perform spraying operations. The geofence provides a boundary in which spraying operations may occur. The UAV 100, 410 may receive a geofence boundary from the GCS, or other computing device, of where spraying may be allowed. The geofence boundary defines a geo-spatial boarder around an area. For example, a geofence for the exemplary field of FIG. 4A may be generated by a GCS or other flight planning system. The user interface may receive a selection for a geofence boundary, and/or the geofence boundary may be automatically determined based on plot boundary information. The UAV 100, 410 may determine based on its current geospatial of whether or not the UAV is located within the geofence boundary.

Sometimes due to strong winds the UAV 100, 410 may slightly deviate or drift off course from its intended flight path. The UAV 100, 410 may periodically monitor its current geo-spatial position, and if the UAV 100, 410 crosses the geofence boundary and/or flies within a predetermined proximity of the geofence boundary (e.g., 3-5 meters), then the UAV 100, 410 may stop spraying operations. If the UAV 100, 410 crosses back into the geofence boundary, then the UAV 100, 410 may start spraying operations. Using a geofence boundary to cease spraying operations is especially useful when the UAV 100, 410 is flying a leg perpendicular to the border of a field to avoid unintentionally spraying chemical beyond the plot boundary.

In another embodiment, the UAV primary processing system 200 may assess, based on its geo-spatial position, whether the UAV has deviated a predetermined distance (e.g. 3-5 meters) from its flight path. If the UAV meets or exceeds the predetermined distance, then the system 200 may stop spraying chemical. When the system 200 determines that the UAV has returned to within the predetermined distance of the flight path, then the system 200 may resume spraying operations.

Additionally, the GCS and/or of UAV primary processing system 200 may assess the dimensions of a plot or area to be sprayed and determine an optimal number of spray segments to adequately cover the area with sprayed chemical. The GCS and/or UAV primary processing system 200 may determine at which altitude, the UAV 100, 410 would effectively cover a ground area with chemical. Input may be received by the GCS and/or UAV primary processing system 200 identifying the dimensions and/or geo-spatial coordinates of the plot to be sprayed. For example, in a pre-flight planning mode the GCS may allow user input where an operator may select or place a bounding box over a displayed image (e.g. an aerial image) of an intended area to be sprayed (such as a plot or field). Based on associated geographic information of the image (e.g. GPS coordinates), an area may be determined for the bounding box. This bounding box with the geospatial information may be transmitted to the UAV 100, 410 for use as a geofence to control areas of spraying (as described above). Based on the determined area, an optimal number of spray segments or legs for a flight pattern may be determined. For example, at an altitude of 3 meters (9 feet), the ground coverage along a flight path may be about 15 feet wide, whereas at an altitude of 4 meters (12 feet), the ground coverage may be about 20 feet wide. Flying at a lower altitude may require more legs to be flown than would flying at a higher altitude. However, the surface coverage of spraying chemical at a higher may not be as effective as flying at a lower altitude.

Additionally, a takeoff and landing area for the UAV 100, 410 may be specified via a user interface (such as receiving specifying a location on a displayed image). Moreover, the user interface may suggest to the user different options for a take-off and/or landing location. The system may evaluate the displayed imagery and identify suitable take-off and/or landing locations (e.g., identifying side-roads, open areas, etc.).

Also, the GCS may receive a ground location of the UAV 100, 410. For example, an operator may place the UAV 100, 410 on the ground where the operator has determined that the UAV 100, 410 has sufficient runway to take-off and clear any obstacles. The UAV primary processing system 200 may transmit its geo-spatial location to the GCS. The GCS and/or UAV primary processing system 200 may then calculate optimal spray segments (or legs) based on the starting location of the UAV. For example, based on the location of the UAV and the location of the field to be sprayed, the system 200 may determine a flight plan the minimizes overall flight time. For example, in FIG. 4A the starting location is shown by arrow 420. There may be a dirt road or open field suitable from which the UAV may take-off. The GCS and/or UAV primary processing system 200 may determine flight pattern with an appropriate number of legs and desired altitude to adequately disperse chemical over the plot. In FIG. 4A, 9 legs were calculated for coverage of the plot. The number of spray segments (or legs) to be flown by the UAV may be increased or reduced based on the altitude of the UAV, and/or the take-off and or landing location of the UAV.

Additionally, the GCS may receive an indication of the crop type (such as corn, wheat, cabbage, apple tree, almond trees, types, etc.). The GCS may store profiles of the ideal altitude and/or spray volume to adequately cover the crops. The GCS and/or primary processing system 200 may then generate the flight pattern based on the crop type using the ideal altitude and/or spray volume for the crop profile.

Additionally, the GCS and/or primary processing system 200 may utilize wind speed and wind direction to identify suitable take-off and/or landing locations. With a fixed-wing UAV 100, 410 ideally the UAV will take off and land into the wind. Wind speed and direction values may be used to determine the take-off direction and landing direction of the UAV 100, 410. In certain situations, a take-off or landing location identified as suitable may be identified as unsuitable due to the wind speed and direction. For example, a road running North to South may have been identified as a possible take-off location with the take-off position at the North-end of the road. If the wind speed and direction is from a North to South direction and at above a certain speed threshold (e.g. greater than 3 knots), the identified take-off location may be identified an unsuitable for take-off. Instead of taking off into the wind, in this case the UAV 100, 410 would be taking off with a tailwind. The GCS and/or UAV primary processing system 200 may in such a case prevent the launching of the UAV due to the wind conditions.

The UAV primary processing system 200 may generate a flight plan having waypoints for controlling spraying by the UAV 100. In other words, the UAV may autonomously control spraying without receiving a flight plan from the GCS. The UAV 100 may receive information about a desired area (such as a geofence, geo-spatial locations of a field, etc.), in which the UAV 100 would perform spraying operations. The UAV primary processing system 200 may calculate a flight path to perform spraying operations including a number of legs and starting and stopping spraying locations based on the boundaries of the geofence or other geo-spatial information about the spraying area. For example, the UAV 100 may determine five legs are required to be flown over a desired area. While autonomously flying each leg of the flight path, the UAV may automatically start spraying when the UAV 100 enters a leg of the flight path crossing a boundary into the field. When the UAV 100 exits or nears the boundary of the field, the UAV may then automatically cease spraying operations. The UAV 100 may then perform a turn (with spraying stopped) and then enter onto the path of the next leg. When the UAV 100 enters into the field boundary on the next leg of the flight path, the UAV 100 may start spraying operations again. The UAV primary processing system 200 would then repeat these operations for each leg of the flight path.

Figure 4B:
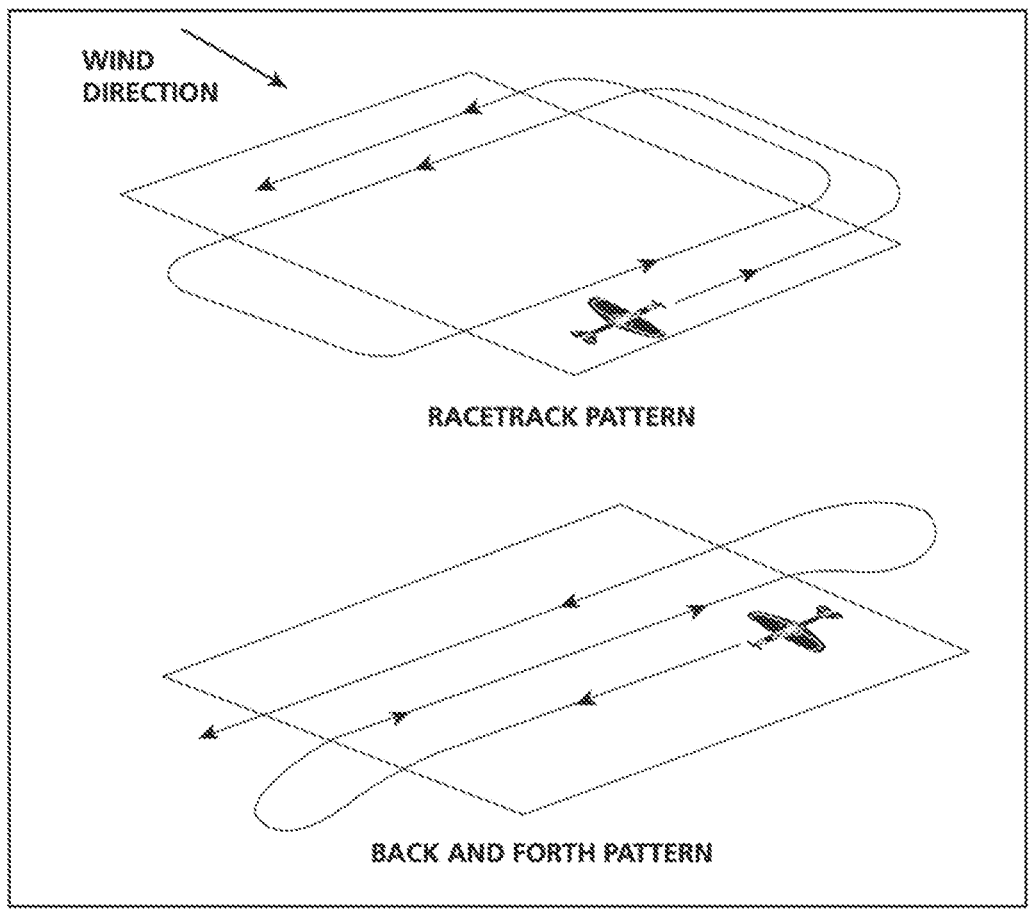
FIG. 4B illustrates an example of an unmanned aerial vehicle performing a flight pattern.

Referring to FIG. 4B, the UAV 100 may determine different flight path configurations to optimally perform spraying operations over a field. For example, the UAV 100 may perform a racetrack pattern where the UAV sprays along non-contiguous legs at different sides of a field. The UAV 100 may perform a leg along a first direction and then perform a non-contiguous leg along a second opposite direction.

Additionally, as described in reference to FIG. 4A, the UAV 100 may perform a back and forth pattern where each leg is contiguous to the proceeding leg, and each contiguous leg is performed in an alternate opposite direction.

The UAV 100 primary processing system 220 may determine an appropriate flight path configuration based on wind speed and direction. For example, the UAV 100 may choose a racetrack flight pattern if high or strong winds exist. A user may enter a wind speed into the GCS, and the UAV 100 may receive the wind speed and direction. Based on the received wind speed and direction value, the UAV primary processing system 200 may determine a particular flight path configuration.

Figure 5:
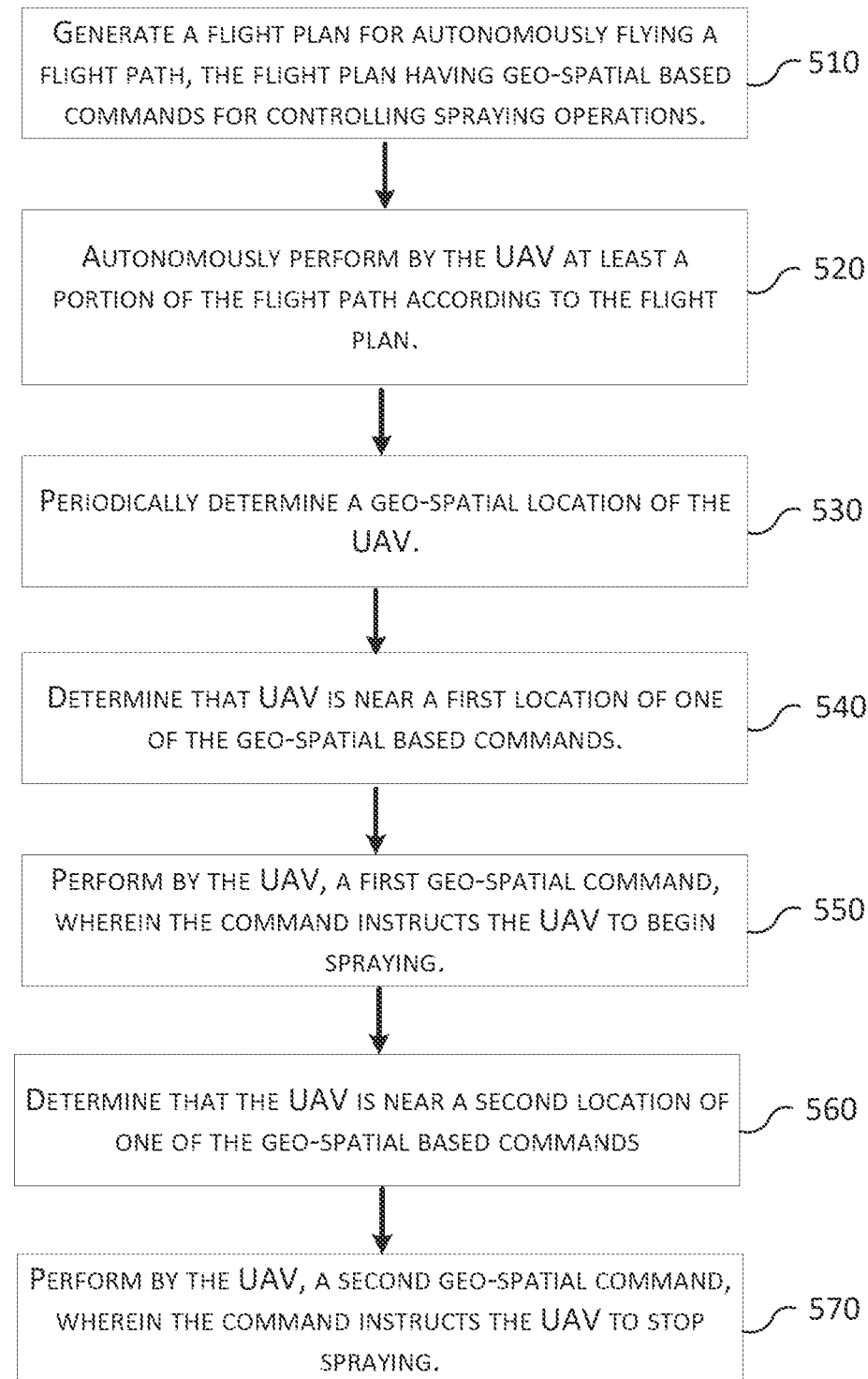
FIG. 5 illustrates an example process for an unmanned aerial vehicle performing a flight pattern for aerial spraying.

FIG. 5 illustrates an example process for an unmanned aerial vehicle for controlling aerial spraying of a chemical along a flight path. The UAV receives a flight plan for controlling the autonomous flight of the UAV (510) along a flight path. The flight plan includes one or more geo-spatial based commands for controlling spraying operations. The UAV autonomously performs at least a portion of the flight plan and flies along the flight path (520). The UAV periodically monitors its geo-spatial location using the on-board GPS system (e.g., every 1-2 seconds) (530). The UAV determines that is it near a first location of one of the geo-spatial based commands (540). The UAV performs the first command of initiating spraying operations (550) causing the UAV spray system to disperse chemical. The UAV flies along the flight path while spraying the chemical. The UAV continues to monitor its geo-spatial position. The UAV determines that it is near a second location of one of the geo-spatial based commands (560). The UAV performs the second command to cease spraying operations (570). The UAV may continue to autonomously fly along the flight path and determine whether to perform other geo-spatial based commands to start and stop spraying operations.

Automatic Droplet Size Adjustment

FIG. 6 illustrates an example process for an unmanned aerial vehicle for adjusting the droplet size of dispersed chemical. The UAV primary processing system 200 adjusts or sets the spray boom to disperse chemical at a first droplet size (610). The system 200 causes the UAV to disperse chemical at the first droplet size along a flight path of the UAV (620). The system 200 determines the occurrence of a physical obstacle along the flight path of the UAV (630). In response to the determined physical obstacle, the system 200 causes the UAV to ascend in altitude (640). The system 200 adjusts the spray boom to disperse chemical at a second droplet size greater than the first droplet size (650). While the UAV ascends in altitude, the system 200 causes the UAV to disperse chemical at the second droplet size (660). The system 200 then causes the UAV to cease dispersing the chemical (670). For example, the system 200 may cause the UAV to stop dispersing chemical when the UAV has reached a predetermined geo-spatial waypoint, has cleared the obstacle, and/or has reached a predetermined altitude.

The system 200 may utilize a function that maps a planned altitude with a particular droplet size in a continuous manner. For example, the system 200 may choose for a first height (e.g., heights of 2 meters and below), a first droplet size (e.g., 200 micron droplets) to be used for spraying operations. As the height of the UAV increases from the first height to a second height (e.g., 5 meters), the system 200 may continually increase the droplet size from the first droplet size of 200 micron to a second droplet size (e.g., 500 micron). Conversely, the system 200 may continually decrease the droplet size from the second height to the first height while the UAV is descending. The function that maps from the height to droplet size may be linear, quadratic, etc.

Also, the system 200 may evaluate for or detect physical obstacles that may be in the UAV's flight path (e.g., using forward-facing LiDAR). The UAV may also have received an indication of the geo-spatial locations of the physical obstacles from the GCS. The system 200 may determine that a physical obstacle lies ahead of the UAV and the system 200 may need to adjust the speed of the rotary atomizers in advance of flying within a certain distance of the detected or known physical obstacle. The system 200 may need to increase the spray volume, decrease the spray volume, or completely stop the dispersion of chemical before reaching the obstacle. However, to account for a slight delay in the adjustment to the rotary atomizer and where the chemical will actually be sprayed, the system 200 would have to make the adjust to change the flow rate based on the velocity of the UAV. For example, the system 200 would need to know that in a particular period of time (e.g., 0.5 seconds) the UAV is going to gain a particular distance (e.g., 1 meter). The system 200 would then start slowing down the rotary atomizers so that in 0.5 seconds, the rotary atomizers are at a correct speed to achieve the desired application rate when the UAV reaches an intended location along its flight path.

Similarly, for normal spraying, the pump has a certain amount of delay in pumping operation, both for turning on and turning off the pump. The UAV primary processing system 200 may evaluate in advance (e.g., looking ahead at the flight path) to determine when the UAV will have to actually begun spraying, and/or to have actually stopped spraying. The system 200 may then determine when and/or where based on its geo-spatial location of commanding the pump to start or stop spinning based on information about where the airplane will be in the future along its flight path.

As discussed previously, the UAV 100 may include spray booms 150, 350 where the droplet size of dispersed chemical may be controlled or adjusted by the primary processing system 200. During flight operations, the UAV 100 may fly near the boundary of a plot where a vertical obstacle has to be cleared. For example, an obstacle near a plot boundary may be a building, tower, power lines, trees, hill, etc. In the case of nearing the obstacle, the UAV 100 would need to pull up and ascend to avoid impact with the obstacle. The UAV 100 may use obstacle avoidance sensors to detect an in-flight obstacle. Moreover, the UAV primary processing system 200 may determine its geo-spatial position (e.g., altitude and location) via its GPS sub-system and reference an on-board database indicating geo-spatial locations of physical obstacles.

As the UAV 100 nears the boundaries of a plot and has to ascend to avoid an obstacle, the UAV primary processing system 200 may automatically adjust the droplet size of the dispersed chemical. For example, the droplet size may be increased which reduces the propensity of the droplet to drift. This provides a more accurate placement of the chemical onto an intended surface area. The primary processing system 200 may also variably increase the droplet size as the UAV ascends. As the UAV increases in altitude, the system 200 may periodically adjust the spray system 300 so that larger droplets are formed as the UAV increases in altitude. For example, the system 200 may slow the rotary atomizers down which would increase the size of the droplets. Also, the system 200 may adjust the nozzle size or nozzle angle relative to the airflow to increase the size of the droplets.

FIG. 7 illustrates an example process for an unmanned aerial vehicle for adjusting the droplet size of dispersed chemical. The UAV primary processing system 200 adjusts or sets the spray boom to disperse chemical at a first droplet size (710). The system 200 causes the UAV to disperse chemical at the first droplet size along a flight path of the UAV (720). The system 200 determines a geo-spatial location of the UAV (730). In response to the determining the geo-spatial location, the system 200 causes the UAV to adjust the spray boom to disperse chemical at a second droplet size different than the first droplet size (740). The system 200 causes the UAV to disperse chemical at the second droplet size while the UAV along the flight (750). The system 200 then causes the UAV to cease dispersing the chemical (760).

Similar to the adjustment to the droplet size during obstacle avoidance, the primary processing system 200 may adjust the droplet size during UAV flight operations along a flight path. For example, when the UAV 100 is near the middle of a plot flying at a very low altitude above a crop, the system 200 may automatically increase the speed of a rotary atomizer or adjust the nozzle openings of the spray system 300. This change causes a decrease in the dispersed droplet size which in turn improves chemical ground surface coverage. The smaller droplet size, however, increases the chance of chemical drift. As such, dispersion of the chemical at the smaller droplet size near the boundary of a plot may not be ideal. The UAV may, however, adjust the droplet size not only based on the altitude of the UAV, but also based on the location of the UAV to the perimeter or boundary of a plot where chemical is dispersed. The system 200 may adjust the droplet size for the dispersed chemical along its flight path where the droplet size of the dispersed chemical may be larger while the UAV is in closer proximity to the perimeter or boundary of a plot, and the droplet size may be smaller while the UAV is near the middle portions of a plot.

For example, the UAV 100 may determine its actual height above the ground (such as using a laser range finder, LiDAR, or other distance measuring equipment. The system 200 may then adjust the spray system 300 to set the droplet size based on the height and/or proximity to the boundary of a crop or field being sprayed. This allows the system 200 to minimize drift around the boundaries of the plot, as well as increase coverage in the middle of the plot by increasing or decreasing the speed of the rotary atomizers.

Temperature Inversion Detection

FIG. 8 illustrates an example process for an unmanned aerial vehicle for inversion detection and chemical spray cessation. Temperature inversions may be a significant hazard while crop spraying. An inversion is a reversal of the normal behavior of temperature in the troposphere (the region of the atmosphere nearest the Earth's surface), in which a layer of cool air at the surface is overlain by a layer of warmer air. In normal conditions, air temperature usually decreases in altitude. The result of an inversion is that sprayed chemical may sit close to the Earth's surface and potentially travel significant distances before being potentially deposited onto ground. This can end up causing massive crop damage several miles from where the chemical was initially sprayed. When there is no inversion, small droplets won't sit, but will instead move upwards and dissipate.

The UAV primary processing system 200 obtains a first air temperature value at a first altitude (810). The system 200 causes the UAV to disperse chemical along a flight path of the UAV (820). At a second altitude higher than the first altitude, the system 200 obtains a second air temperature value (830). The system 200 determines the likelihood of a temperature inversion by comparing the first and second temperatures (840). If a temperature inversion is determined likely to exist, then the system 200 will cause the UAV to cease dispersing chemical (850).

The UAV processing system 200 may determine the likelihood of a temperature inversion. The system 200 may periodically measure the ambient temperature of UAV with an on-board temperature sensor. The system 200 may store in memory data values of the temperature value, altitude, date/time and geo-spatial location of the UAV. The system 200 may compare a temperature value from a lower altitude with a temperature value from a higher altitude. The system 200 may determine the likely occurrence of a temperature inversion if the temperature from the higher altitude is warmer than the temperature for a lower altitude. Also, the system 200 may use a threshold temperature difference value, such as having a least a three degree (F. or C.) temperature difference to assess the likelihood of a temperature inversion. In other words, the higher altitude temperature would have to be at least three degrees higher or warmer than the lower altitude temperature. The system 200 may compare the difference of the temperatures and determine if the difference meets or exceed the threshold temperature difference value.

As an example, the UAV primary processing system 200 may command the UAV to perform a first leg of a flight path at a spray height of a couple of meters above the ground surface. During the performance of the leg of the spray run, the UAV may obtain one or more temperature readings along the path of the leg of the spray run. The UAV processing system 200 may average the temperatures values if multiple readings are obtained. After the UAV completes a leg of a spray run, the UAV may begin a turning procedure and may ascend to a higher altitude. The turning procedure allows the UAV to position itself for entry into a next leg of a spray run of the flight path. The UAV may ascend in altitude and reach a turning height (e.g. about 10 meters) above the ground surface. The UAV may obtain temperature readings at or about its maximum turning height. The UAV processing system 200 may then compare the spray leg temperature value obtained near the ground surface to the turning height temperature value and determine whether a temperature inversion is likely to exist.

The system 200 may be configured to automatically cease the spraying if the system 200 determines the likelihood of temperature inversion. Also, the system 200 may be configured to transmit information to the GCS indicating the likelihood of a temperature inversion. The GCS may present, via a user interface, information about the likelihood of a temperature inversion. The operator then may abort the flight plan of the UAV if an inversion is likely. The UAV may then land at a designated landing location.

Automated Chemical Dispersion Cessation

FIG. 9 illustrates an example process for an unmanned aerial vehicle for automated chemical dispersion cessation. The UAV may autonomously perform a pre-planned flight path (910). During the performance of the flight plan, the UAV primary processing system 200 instructs the UAV 100 to fly along a pre-determined flight path. The system 200 instruct the UAV to disperse chemical along portions of the flight path (920). Environmental conditions or physical objects may exist near or about the flight path of the UAV. During flight operations the system 200 periodically determines the occurrence of a cessation event (930). A cessation event is the occurrence of certain environmental conditions or detection of physical objects where the UAV should cease or stop spraying chemical. If the occurrence of a cessation event is determined, the system 200 stops the pump motors to cease spraying of chemical (940). In one embodiment, the system 200 may optionally transmit to a GCS information pertaining to the cessation event (950). The system 200 may receive a command form the GCS to resume spraying. The system 200 may determine to whether to resume spraying (960). For example, if the system 200 received a resume spraying instruction from the GCS, and/or determining that the cessation event is no longer occurring (970).

During flight operations the UAV 100 may use sensor data (such as from a LiDAR sensor) to evaluate the occurrence of objects about the surface area to be sprayed. The UAV may detect objects in the spray area that were previously unknown (e.g., a person, vehicle or animal moving in the spray area. Based on determining that the object exists in the field, the system 200 may determine that a cessation event has occurred. In response to determining that a cessation event has occurred, the UAV 100 may cease spraying of chemicals.

Folding Propellers

FIG. 10 illustrates an example process for an unmanned aerial vehicle for folding propeller for aerial spraying. The UAV autonomously performs a flight path (1010). The UAV may have one or more motors connected to operating spinning propellers. The UAV may cease rotation of one or more motors (1020). For example, the UAV may determine that it is near (e.g., within a threshold distance) or a particular geo-spatial location, and that it should cease rotation of the motors. The propellers may be of a foldable type such that ceasing rotation of the propeller allows the propeller to fold backwards. The UAV continues rotation of at least one motor and connected propeller to provide forward thrust of the UAV. The UAV may then disperse chemical along the flight path (1030). The UAV may then cease dispersing the chemical along the flight path (1040). The UAV starts rotation of the one or more ceased motors, thereby providing forward thrust to the UAV (1050). For example, the UAV may determine that it is near (e.g., within a threshold distance) or at a particular geo-spatial location, and may cease dispersing the chemical, and then start rotation of the ceased motors.

In one embodiment, the UAV 100 has three motors. One motor is mounted on each wing of the UAV, and motor is mounted on the tail of the UAV. During flight operations, the primary processing system 200 may stop rotation of the propellers of the wing motors. The wing propellers on the wings may be fixed pitch and may passively fold aft toward the tail of the UAV 100 once the wing propellers have stopped rotating. The system 200 may increase or adjust the rotational speed of the tail propeller to provide are fixed pitch and passively fold when not in use. In one configuration, the propeller on the tail of the UAV 100 is also fixed pitch but cannot fold.

The UAV 100 may perform flight operations with only the tail propeller in use and the wing propellers folded. In one configuration of the UAV 100, the pitch of the wing propellers may be optimized for climbing, while the tail propeller may be optimized for cruising. This configuration with the foldable wing propellers may be used while the UAV is dispersing chemicals. By allowing the wing propellers to fold backward, the prop wash is minimized or eliminated. In other words, with the wing propellers folded backwards during spraying, doing so minimizes the effect that the propulsion system has on the spray pattern left behind the aircraft. If left operational with the prop unfolded, the prop wash from the wing propellers may get quite close to the spray boom and negatively influence or disrupt an optimal or desired spray pattern. In contrast, the tail propeller's prop wash clears the spray boom and spray pattern entirely.

Dynamic Spray Path

The UAV primary processing system 200 may dynamically adjust the UAV spraying operations during performance of its flight plan. For example, the system 200 may dynamically adjust the UAV flight path and spray operations to account for variation in wind speed. The system 200 may continually estimate wind speed and direction by comparing airspeed, yaw, angle of sideslip, and course over ground (e.g., from received GPS geo-spatial location information). The system 200 may use the UAV's target height above the ground in conjunction with a physics model that predicts how far the released chemical will drift given a particular release height, vehicle speed, and wind speed/direction in order to adjust its spray path in the X/Y plane, or adjust the moment it turns on spray/turns off spray so that the chemical is released at a location that will result in the chemical landing on a predetermined target area. Based on the physics model, the system 200 may then determine the aerial locations of where to release chemical to effectively spray a field and minimize chemical drift to unintended surface locations.

In an example, the UAV could maintain its original X/Y flight path (e.g., flying a leg of a flight pattern) and adjust the turn on and turn off time of the spray pump to compensate for a head wind/tail wind. This is a particularly useful adjustment to make, as the drift distance of sprayed chemical is the largest when the airplane is pulling up/diving in. If the UAV encounters a strong tailwind for example, it is ideal to start spraying early as the UAV drops into a leg to start spraying, and it is ideal to stop spraying early as the UAV pull ups when it finishes spraying along a leg of the flight path. By making pump timing adjustments, the UAV is able to account for chemical drift due to wind speed and direction.

Moreover, the UAV primary processing system 200 may account for crosswinds over the X/Y flight path (e.g., flying a leg of a flight pattern). The system 200 would adjust the timing of pump operations as described above, but also the system 200 would make adjustments to it flight path to move the UAV actual position right and/or left of the intended flight path. Making these flight path adjustments, would allow the UAV to compensate for cross winds as the UAV sprays chemical. This compensation is particularly useful as the UAV pulls up after completing a spray run and when the UAV drops into to begin another spray run along a leg of the flight path.

The UAV primary processing system 200 may also use a forward facing LiDAR. Based on generated LiDAR data, the system 200 may estimate the relative position of the ground in front of the UAV compared to the UAV's current aerial position. The system 200 may use the information determine when (e.g., at what geo-spatial location), the UAV would begin a drop in to a leg of a flight path to being spraying operations. The system 200 may also use the generated LiDAR information to assist the UAV in making flight path adjustment where the terrain is unlevel or has obstacles in it. The system 200 may accordingly make adjust to spraying operations as described above.

Insufficient Tank Volume

As described above the UAV primary processing system 200 may monitor the volume (e.g., the tank level) of liquid in the tanks. In certain situations, the UAV 100 may determine that it does not have a sufficient quantity of chemical to complete a flight plan. In such cases, the UAV 100 may determine its then current geo-spatial position and store the location value in memory, cease spraying operations, and then land at a predetermined landing location. An operator may then refill the tanks of the UAV with additional chemical. The operator may initiate a resume function via the GCS. In response, the UAV 100 will autonomously fly to the leg and position where the UAV 100 previously ceased spraying due to having insufficient quantity in the tanks. The UAV 100 will then resume spraying operation at or near the geospatial location of the stored location value. The UAV 100 will then complete the flight plan and continue spraying according to the remainder of the flight plan.

In one implementation, the instructions include instructions to implement functionality corresponding to the components of a device to perform the disclosure herein. While the machine-readable storage medium is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. An unmanned aerial vehicle (UAV) system comprising one or more processors comprising hardware, the one or more processors configured to perform operations comprising:
    autonomously perform a flight path having multiple legs by the UAV, the UAV being a fixed-wing UAV;
    disperse a chemical along portions of the flight path; and
    while performing the flight path, dynamically adjust the flight path to account for wind conditions and disperse the chemical at adjusted portions of the flight path such that the chemical would land at a predetermined target area;
    wherein the UAV includes a chemical spray system which comprises:
        one or more spray booms attached to a body of the UAV, the spray booms having multiple nozzles for dispersing the chemical;
        one or more tanks attached to the body of the UAV; and
        a pump fluidly connected to the tanks and the spray booms.

2. The UAV system of claim 1, further comprising the operations of:
    generate a flight plan for autonomously flying the flight path, the flight plan having geo-spatial based commands for controlling spraying operations;
    autonomously perform by the UAV at least a portion of the flight path according the flight plan;
    periodically determine a geo-spatial location of the UAV;
    determine that the UAV is near a first location of one of the geo-spatial based commands;
    perform by the UAV, a first geo-spatial command, wherein the first geo-spatial command instructs the UAV to begin spraying;
    determine that the UAV is near a second location of one of the geo-spatial based commands; and
    perform by the UAV, the second geo-spatial command, wherein the second geo-spatial command instructions the UAV to stop spraying.

3. The UAV system of claim 1, further comprising the operations of:
    disperse the chemical at a first droplet size along the flight path of the UAV;
    determine the occurrence of a physical obstacle along the flight path of the UAV;
    in response to the determining the occurrence of a physical object along the flight path of the UAV, cause the UAV to ascend in altitude;
    cause the UAV to disperse the chemical at a second droplet size while the UAV ascends in altitude; and
    cause the UAV to cease dispersing the chemical.

4. The UAV system of claim 1, further comprising the operations of:
    disperse the chemical at the first droplet size along the flight path of the UAV;
    determine a geo-spatial position of the UAV;
    in response to the determining the geo-spatial position of the UAV along the flight path;
    cause the UAV to disperse the chemical at a second droplet size along the flight path;
    and cause the UAV to cease dispersing the chemical.

5. The UAV system of claim 1, further comprising the operations of:
    obtain a first air temperature at a first altitude;
    cause the UAV to disperse the chemical along the flight path of the UAV;
    obtain a second air temperature at second altitude;
    determine the likelihood of a temperature inversion by comparing the first and second temperatures; and
    if a temperature inversion is determined likely to exist, then cause the UAV to cease dispersing the chemical.

6. The UAV system of claim 1, further comprising the operations of:
    periodically determine the occurrence of a spraying cessation event, wherein the spraying cessation event is a determined temperature inversion;
    cease dispersing the chemical if the occurrence of a spraying cessation event has been determined;
    determine whether to resume spraying of the chemical; and
    resume spraying of the chemical along the flight path.

7. The UAV system of claim 1, further comprising the operations of:
    autonomously perform the flight path, wherein the UAV has one or more motors connected to operating spinning propellers;
    cease rotation of one or more motors of the UAV, the motors connected to propellers;
    disperse the chemical along the flight path;
    cease dispersing the chemical along the flight path; and
    start rotation of the one or more ceased motors of the UAV thereby providing forward thrust to the UAV.

8. A method performed by an unmanned aerial vehicle (UAV) system comprising one or more processors comprising hardware, the one or more processors configured to perform operations comprising:
    autonomously perform a flight path having multiple legs by the UAV, the UAV being a fixed-wing UAV;
    disperse a chemical along portions of the flight path; and
    while performing the flight path, dynamically adjust the flight path to account for wind conditions and disperse the chemical at adjusted portions of the flight path such that the chemical would land at a predetermined target area;
    wherein the UAV includes a chemical spray system which comprises one or more spray booms having multiple nozzles for dispersing the chemical, one or more tanks attached to the body of the UAV, a pump fluidly connected to the tanks and the spray booms; and wherein the one or more spray booms are attached to a body of the UAV.

9. The method of claim 8, further comprising the operations of:
generate a flight plan for autonomously flying the flight path, the flight plan having geo-spatial based commands for controlling spraying operations;
autonomously perform by the UAV at least a portion of the flight path according the flight plan;
periodically determine a geo-spatial location of the UAV;
determine that the UAV is near a first location of one of the geo-spatial based commands;
perform by the UAV, a first geo-spatial command, wherein the first geo-spatial command instructs the UAV to begin spraying;
determine that the UAV is near a second location of one of the geo-spatial based commands; and
perform by the UAV, the second geo-spatial command, wherein the second geo-spatial command instructions the UAV to stop spraying.

10. The method of claim 8, further comprising the operations of:
disperse the chemical at a first droplet size along the flight path of the UAV;
determine the occurrence of a physical obstacle along the flight path of the UAV;
in response to the determining the occurrence of a physical object along the flight path of the UAV, cause the UAV to ascend in altitude;
cause the UAV to disperse the chemical at a second droplet size while the UAV ascends in altitude; and
cause the UAV to cease dispersing the chemical.

11. The method of claim 8, further comprising the operations of:
disperse the chemical at a first droplet size along the flight path of the UAV;
determining a geo-spatial position of the UAV;
in response to the determining the geo-spatial position of the UAV along the flight path;
cause the UAV to disperse the chemical at a second droplet size along the flight path;
and cause the UAV to cease dispersing the chemical.

12. The method of claim 8, further comprising the operations of:
obtain a first air temperature at a first altitude;
cause the UAV to disperse the chemical along the flight path of the UAV;
obtain a second air temperature at second altitude;
determine the likelihood of a temperature inversion by comparing the first and second temperatures; and
if a temperature inversion is determined likely to exist, then cause the UAV to cease dispersing the chemical.

13. The method of claim 8, further comprising the operations of:
periodically determine the occurrence of a spraying cessation event, wherein the spraying cessation event is a determined temperature inversion;
cease dispersing the chemical if the occurrence of a spraying cessation event has been determined;
determine whether to resume spraying of the chemical; and
resume spraying of the chemical along the flight path.

14. The method of claim 8, further comprising the operations of:
autonomously perform the flight path, wherein the UAV has one or more motors connected to operating spinning propellers;
cease rotation of one or more motors of the UAV, the motors connected to propellers;
disperse the chemical along the flight path;
cease dispersing the chemical along the flight path; and
start rotation of the one or more ceased motors of the UAV thereby providing forward thrust to the UAV.

15. A computer storage medium comprising instructions that when executed by one or more process included of an unmanned aerial vehicle (UAV) system, cause the system to perform the operations comprising:
autonomously perform a flight path having multiple legs by the UAV, the UAV being a fixed-wing UAV;
disperse a chemical along portions of the flight path; and
while performing the flight path, dynamically adjust the flight path to account for wind conditions and disperse the chemical at adjusted portions of the flight path such that the chemical would land at a predetermined target area;
wherein the UAV includes a chemical spray system which comprises one or more spray booms having multiple nozzles for dispersing the chemical; and
wherein the UAV further comprises:
one or more tanks attached to the body of the UAV;
a pump fluidly connected to the tanks and the spray booms; and
wherein the one or more spray booms are attached to a body of the UAV.

16. The computer storage medium of claim 15, wherein the operations further comprise:
generate a flight plan for autonomously flying the flight path, the flight plan having geo-spatial based commands for controlling spraying operations;
autonomously perform by the UAV at least a portion of the flight path according the flight plan;
periodically determine a geo-spatial location of the UAV;
determine that the UAV is near a first location of one of the geo-spatial based commands;
perform by the UAV, a first geo-spatial command, wherein the first geo-spatial command instructs the UAV to begin spraying;
determine that the UAV is near a second location of one of the geo-spatial based commands; and
perform by the UAV, the second geo-spatial command, wherein the second geo-spatial command instructions the UAV to stop spraying.

17. The computer storage medium of claim 16, wherein the operations further comprise:
disperse the chemical at a first droplet size along the flight path of the UAV;
determine the occurrence of a physical obstacle along the flight path of the UAV;
in response to the determining the occurrence of a physical object along the flight path of the UAV, cause the UAV to ascend in altitude;
cause the UAV to disperse the chemical at a second droplet size while the UAV ascends in altitude; and
cause the UAV to cease dispersing the chemical.

18. The computer storage medium of claim 16, wherein the operations further comprise:
disperse the chemical at a first droplet size along the flight path of the UAV; determining a geo-spatial position of the UAV;
in response to the determining the geo-spatial position of the UAV along the flight path,
cause the UAV to disperse the chemical at a second droplet size along the flight path;
and cause the UAV to cease dispersing the chemical.

19. The computer storage medium of claim 16, wherein the operations further comprise:
 obtain a first air temperature at a first altitude;
 cause the UAV to disperse the chemical along the flight path of the UAV; obtain a second air temperature at second altitude;
 determine the likelihood of a temperature inversion by comparing the first and second temperatures; and
 if a temperature inversion is determined likely to exist, then cause the UAV to cease dispersing the chemical.

20. The computer storage medium of claim 16, wherein the operations further comprise:
 periodically determine the occurrence of a spraying cessation event, wherein the spraying cessation event is a determined temperature inversion;
 cease dispersing the chemical if the occurrence of a spraying cessation event has been determined;
 determine whether to resume spraying of the chemical; and
 resume spraying of the chemical along the flight path.

21. The computer storage medium of claim 16, wherein the operations further comprise:
 autonomously perform the flight path, wherein the UAV has one or more motors connected to operating spinning propellers;
 cease rotation of one or more motors of the UAV, the motors connected to propellers;
 disperse the chemical along the flight path;
 cease dispersing the chemical along the flight path; and
 start rotation of the one or more ceased more of the UAV thereby providing forward thrust to the UAV.

\* \* \* \* \*